United States Patent
Ito et al.

(10) Patent No.: US 7,090,575 B2
(45) Date of Patent: Aug. 15, 2006

(54) AIR PASSAGE OPENING AND CLOSING DEVICE CAPABLE OF PREVENTING UNCOMFORTABLE NOISE

(75) Inventors: Masahiro Ito, Takahama (JP); Hideo Takemoto, Kariya (JP)

(73) Assignees: DENSO Corporation, Kariya (JP); Shimizu Industry, Kariya (JP)

(*) Notice: Subject to any disclaimer, the term of this patent is extended or adjusted under 35 U.S.C. 154(b) by 0 days.

(21) Appl. No.: 10/979,951

(22) Filed: Nov. 2, 2004

(65) Prior Publication Data

US 2005/0095970 A1 May 5, 2005

(30) Foreign Application Priority Data

Nov. 4, 2003 (JP) .............................. 2003-374612

(51) Int. Cl.
*B60H 3/00* (2006.01)
(52) U.S. Cl. .................. 454/156; 454/69; 454/121; 251/314
(58) Field of Classification Search .............. 454/69, 454/121, 156, 159, 160, 161; 251/314, 306, 251/317
See application file for complete search history.

(56) References Cited

U.S. PATENT DOCUMENTS 5,499,947 A * 3/1996 Tauber ..................... 454/69
5,679,073 A * 10/1997 Hsieh et al. ................. 454/69
6,193,600 B1 * 2/2001 Ito et al. ..................... 454/69
2001/0014582 A1 * 8/2001 Ito ............................. 454/69

FOREIGN PATENT DOCUMENTS

JP 2570855 2/1998

* cited by examiner

*Primary Examiner*—Gregory Wilson
(74) *Attorney, Agent, or Firm*—Harness, Dickey & Pierce, PLC

(57) ABSTRACT

An air passage opening and closing device for controlling an air flow for air-conditioning a vehicle compartment which is adapted to reduce an uncomfortable noise generated when the opening degree of a door such as an air-mixing door is small is provided, wherein a plurality of extending portions (7g) are provided on tips of the lip seal (7c). The extending dimension (H) of the extending portion (7g) is more than or equal to substantially 1 mm and less than or equal to substantially 3 mm, the dimension (B) in the width direction orthogonal to the extending direction in the extending portion (7g) is more than or equal to substantially 2 mm and less than or equal to substantially 14 mm, and the gap distance (G) between the adjacent extending portions (7g) is more than or equal to substantially 1 mm and less than or equal to substantially 4 mm.

12 Claims, 6 Drawing Sheets

Fig.10

EFFECTIVE RANGE
IN REDUCING
ABNORMAL NOISE
(HEIGHT (H)
OF EXTENDING
PORTION H:1mm)

○: EFFECTIVE IN REDUCING ABNORMAL NOISE   ✕: INEFFECTIVE IN REDUCING ABNORMAL NOISE

| WIDTH(B) OF EXTENDING PORTION (mm) \ WIDTH(G) OF GAP (mm) | \multicolumn{4}{c}{FIAR WIND} | | | |
|---|---|---|---|---|
| | 1 | 2 | 3 | 4 |
| 1 | ○ | ○ | ✕ | ✕ |
| 2 | ○ | ○ | ○ | ○ |
| 9 | ○ | ○ | ○ | ○ |
| 14 | ○ | ○ | ○ | ○ |

AIR PASSAGE OPENING AND CLOSING DEVICE CAPABLE OF PREVENTING UNCOMFORTABLE NOISE

BACKGROUND OF THE INVENTION

1. Field of the Invention

The present invention relates to an air passage opening and closing device for opening and closing an air passage and is effective as an air-mixing door for adjusting the ratio of an air flow of a hot air with respect to that of a cold air (air mixing ratio), a discharging mode switching door for switching the discharging mode, or the like, in an air conditioner for a vehicle.

2. Description of the Related Art

FIG. 1 is a drawing showing a structure of an indoor unit (the indoor unit is named so because it is arranged inside a vehicle compartment or near the compartment) of an air conditioner for a vehicle which has already been produced as a product and has been distributed on a market at the time of filing of the present application. FIG. 2 is an enlarged perspective view of A portion in FIG. 1 and FIG. 3 is a sectional view taken along the line 3A—3A in FIG. 2.

In FIG. 1, an air-conditioner casing 1 is a duct means which forms an air passage which is furnished in a vehicle compartment and from which air is discharged to an inside of the compartment. A blower (not shown) for supplying the air into the compartment is provided on a lower front side of the air-conditioner casing 1 in the drawing.

At the upstream side of an air flow in the air-conditioner casing 1, an evaporator 2 for cooling air discharged into the compartment is accommodated and all the air discharged from the blower passes through the evaporator 2.

At the downstream side of the air flow of the evaporator 2, a heater core 3 for heating air discharged into the compartment is accommodated and, at the same time, a bypass passage 4 to allow air, which has passed through the evaporator 2, to bypass the heater core 3 and to flow into the compartment side, is provided.

An air-mixing door 7 is an air flow ratio adjusting means for adjusting the air flow ratio of a cold air passing through the bypass passage 4 with respect to a hot air passing through the heater core 3. An air-mixing chamber 8 is an air-mixing chamber for mixing the cold air passing through the bypass passage 4 and the hot air passing through the heater core 3.

At the upper side of the air-mixing chamber 8, a face opening portion 9 communicating to a face discharge port (not shown) for discharging air to the upper side of the vehicle compartment through a duct (not shown) and a defroster opening portion 10 communicating to a defroster discharge port (not shown) for discharging air to vehicle windows (mainly to a front window glass) through a duct (not shown) are provided. On the other hand, at the lower side of the air-mixing chamber 8, a foot opening portion for discharging air to the lower side of the vehicle compartment.

A face door 11 is an opening and closing means for opening and closing the face opening portion 9, a defroster door 12 is an opening and closing means for opening and closing the defroster opening portion 10, and a foot door 13 is an opening and closing means for opening and closing the foot opening portion.

The air-mixing door 7, the face door 11, the defroster door 12 and the foot door 13 open and close the respective opening portions thereof by swinging (rotating) rectangular plate-like door bodies thereof, around the rotation axes of the opening portions as a center, by actuators such as a servo motor, etc. Because of the above configuration, the structure of opening and closing means will be explained below using an air-mixing door 7 as an example.

In FIG. 2, an opening portion 1a is an inlet port continuing to the evaporator 2 in air passages constituted by the air-conditioner casing 1 and the air-mixing door 7 is arranged at the upstream side of the air flow in the opening portion 1a so that it is possible to swing.

The air-mixing door 7 comprises: a substantially rectangular door body 7a for opening and closing the opening portion 1a; a shaft portion 7b acting as a swinging shaft of the air-mixing door 7, i.e. the door body 7a; an elastically deformable lip seal 7c which is arranged on a portion corresponding to the edge portions 1b of the opening portion 1a and in the edge side of the door body 7a and closes a gap created between the air-mixing door 7 and the edge portions 1b of the opening portion 1a when the opening portion 1a is closed by the air-mixing door 7; an elastically deformable second lip seal 7d which closes a gap at the shaft portion 7b side in the edge portions 1b of the opening portion 1a; and the like.

Particularly, the door body 7a and the shaft portion 7b are made of hard resin such as polypropylene and the lip seals 7c, 7d are made of flexible resin, such as elastomer, or rubber. Both of them are integrated by integral forming.

The sectional shape of the lip seal 7c is formed in a V shape, as shown in FIG. 3, so that a portion at which a side 7e shown at the upper side of the drawing (FIG. 3) and another side 7e shown at the lower side of the drawing are joined is positioned near to the door body 7a. The side 7e of the lip seal 7c at the lower side of the drawing is a seal means for closing gaps created between the air-mixing door 7 and the edge portions 1b of the opening portion 1a and the side 7e of the lip seal 7c at the upper side of the drawing is a seal means for closing gaps created between the air-mixing door 7 and edge portions 4a of the bypass passage 4 (refer to FIG. 1).

At the tips of the lip seal 7c, i.e. the tip sides of the sides 7e, protruding portions 7f protruding toward the edge portions 1b and toward the edge portions 4a are integrally formed with the lip seal 7c and, thereby, the sealing ability of the lip seal 7c is improved by contacting the tips of the protruding portions 7f to the edge portions 1b and 4a.

Concretely, the protruding portion 7f totally forms a substantially C-shaped protruding line continuously provided on the totally substantially C-shaped lip seal 7c in a similar state to the lip seal 7c which is formed in a substantially C-shape on the end of the door body 7a.

The second lip seal 7d is formed so that two sides 7e of the lip seal 7c forming a V shape are combined into one side and the other structure thereof is the same as that of the lip seal 7c.

When the opening degree of the air-mixing door 7 is small, an uncomfortable noise such as "hyu", "pyu" or "pyy" is likely to occur. The cause of the noise is generally as described below.

That is, when the opening degree of the air-mixing door 7 is small, as shown in FIG. 4, there may be a case in which air flows through a relatively small gap (a short distance) formed between the edge portion 1b of the opening portion 1a and the air-mixing door 7 in a laminar flow without being transformed into a turbulent flow. Part of an air flow after flowing through the air-mixing door 7 creates an exfoliating layer (an exfoliating flow) exfoliating from a main air flow, at the back side of the air-mixing door 7, and in a case in which the exfoliating layer grows into a row of vortexes, an uncomfortable noise such as "hyu" is created.

A means for reducing a noise caused by a row of vortexes created when air flows through a relatively small gap formed between an edge portion of an opening portion and an opening and closing door was conventionally realized by forming recesses and protrusions on the tip side of a lip seal to disturb an air flow passing through a gap between the lip seal and the edge portion of the opening portion and to prevent the air flow from being formed into a laminar flow, with a result preventing a row of vortexes from being created (for example, refer to Patent Document 1).

[Patent Document 1] Japanese Utility Model Publication No. 2,570,855

As the invention disclosed in Patent Document 1, however, relates to an opening and closing door for opening and closing a discharge port such as a face discharging port directly facing an inside of a vehicle compartment, it can not be applied to the air-mixing door 7 arranged in the air-conditioner casing 1, and the like, without modification and can not prevent efficiently the occurrence of a row of vortexes.

SUMMARY OF THE INVENTION

The present invention has been developed with the above-mentioned problems being taken into consideration, the first object thereof is to provide a novel air passage opening and closing device different from the prior art and the second object thereof is to reduce uncomfortable noise by preventing the occurrence of vortexes.

To realize the above-mentioned objects, in a first aspect of the present invention, an air passage opening and closing device for controlling an air flow for air-conditioning a vehicle compartment is disclosed which comprises: a casing (1) of an air conditioner for a vehicle, which has an opening portion (1a) through which air flows, forms air passages (4, 8) and is provided with at least an evaporator (2); and an opening and closing door (7) which opens and closes the opening portion (1a) and mixes an air from the evaporator (2) with a hot air or switches air discharging modes at least between a face mode and a foot mode; wherein on a portion of an end side of the opening and closing door (7), corresponding to an edge portion of the opening portion (1a), an elastically deformable lip seal (7c) for closing a gap formed between the opening and closing door (7) and the edge portion of the opening portion (1a) when the opening portion (1a) is closed by the opening and closing door (7) is provided, and on a tip of the lip seal (7c) a plurality of extending portions (7g) are provided; and wherein the extending dimension (H) of the extending portions (7g) is more than or equal to substantially 1 mm and less than or equal to substantially 3 mm, the dimension (B) in the width direction orthogonal to the extending direction in the extending portions (7g) is more than or equal to substantially 2 mm and less than or equal to substantially 14 mm, and the gap distance (G) between the adjacent extending portions (7g) is more than or equal to substantially 1 mm and less than or equal to substantially 4 mm.

By this configuration, it is possible to disturb and mix an air flow passing through the gap between the lip seal (7c) and the edge potion of the opening portion (1a) and, therefore, it is possible to restrict the generation of a row of vortexes by preventing the air flow from becoming a laminar flow. As a result, it is possible to prevent the occurrence of uncomfortable abnormal noise such as "hyu".

In addition, as the extending dimension (H) of the extending portions (7g) is more than or equal to substantially 1 mm and less than or equal to substantially 3 mm, the dimension (B) in the width direction orthogonal to the extending direction in the extending portions (7g) is more than or equal to substantially 2 mm and less than or equal to substantially 14 mm, and the gap distance (G) between the adjacent extending portions (7g) is more than or equal to substantially 1 mm and less than or equal to substantially 4 mm, it is clear from FIG. 10, described later, that it is possible to reduce the occurrence of the abnormal noise by ensuring to prevent the generation of the row of vortexes.

In a second aspect of the present invention, an air passage opening and closing device is disclosed which comprises: a casing (1) for air conditioning of a vehicle, which has an opening portion (1a) through which air flows, forms air passages (4, 8); and an opening and closing door (7) which opens and closes the opening portion (1a); and is characterized in that; on a portion of an end side of the opening and closing door (7), corresponding to an edge portion of the opening portion (1a), an elastically deformable lip seal (7c) for closing a gap formed between the opening and closing door (7) and the edge portion of the opening portion (1a) when the opening portion (1a) is closed by the opening and closing door (7) is provided, and on tips of the lip seal (7c) a plurality of extending portions (7g) are provided; and in that the extending dimension (H) of the extending portions (7g) is more than or equal to substantially 1.5 mm and less than or equal to substantially 3 mm, the dimension (B) in the width direction orthogonal to the extending direction in the extending portions (7g) is more than or equal to substantially 5 mm and less than or equal to substantially 10 mm, and the gap distance (G) between the adjacent extending portions (7g) is more than or equal to substantially 2 mm and less than or equal to substantially 4 mm.

By this configuration, it is possible to disturb and mix an air flow passing through the gap between the lip seal (7c) and the edge potion of the opening portion (1a) and, therefore, it is possible to restrict the generation of a row of vortexes by preventing the air flow from becoming a laminar flow. As a result, it is possible to prevent the occurrence of uncomfortable abnormal noise such as "hyu".

Moreover, as the extending dimension (H) of the extending portions (7g) is more than or equal to substantially 1.5 mm and less than or equal to substantially 3 mm, the dimension (B) in the width direction orthogonal to the extending direction in the extending portions (7g) is more than or equal to substantially 5 mm and less than or equal to substantially 10 mm, and the gap distance (G) between the adjacent extending portions (7g) is more than or equal to substantially 2 mm and less than or equal to substantially 4 mm, it is clear from FIG. 10, described later, that it is possible to reduce the occurrence of the abnormal noise by ensuring to prevent the generation of the row of vortexes.

In a third aspect of the present invention, an air passage opening and closing device is characterized in that; on a root side of the extending portion (7g), protruding portions (7f) in a linear shape which protrude toward the edge portion of the opening portion (1a) and come into contact with the edge portions when the opening and closing door (7) is closed are integrally formed.

In a fourth aspect of the present invention, an air passage opening and closing device is characterized in that the sectional shape of the lip seal (7c) is a V shape in which a portion thereof near the opening and closing door (7) protrudes.

In a fifth aspect of the present invention, an air passage opening and closing device is characterized in that the lip seal (7c) and the extending portions (7g) provided on the tip of the lip seal (7c) are integrally formed to each other.

In a sixth aspect of the present invention, an air passage opening and closing device is characterized in that the lip seal (7c) and the opening and closing door (7) are integrally formed to each other.

In a seventh aspect of the present invention, an air passage opening and closing device is characterized in that the V shape of the lip seal (7c) which extends toward the opening and closing door (7) has two sides (2e) which separate further in a direction from the tip of the opening and closing door (7) to tips of the sides (2e).

In an eighth aspect of the present invention, an air passage opening and closing device is disclosed wherein the opening and closing door comprises any one of: an air-mixing door (7) for mixing air in the casing (1) of the air conditioner for a vehicle; a face door (11) for directing an air flow from the casing (1) of the air conditioner for a vehicle toward a passenger's face; a defroster door (12) for directing an air flow from the casing (1) of the air conditioner for a vehicle toward a windshield direction; and a foot door (13) for directing an air flow from the casing (1) of the air conditioner for a vehicle toward a passenger's feet; and wherein all of these doors are rectangular, the length of shorter sides thereof is in a range between substantially 3 cm and substantially 10 cm, and the length of longer sides thereof is in a range between substantially 5 cm and substantially 30 cm.

In an ninth aspect of the present invention, an air passage opening and closing device for controlling an air flow for air-conditioning a vehicle compartment comprises: a casing (1) of an air conditioner for a vehicle which has an opening portion (1a) through which air flows and forms air passages (4, 8); and an opening and closing door (7) which opens and closes the opening portion (1a); wherein on a portion of an end side of the opening and closing door (7), corresponding to an edge portion of the opening portion (1a), an elastically deformable lip seal (7c) for closing a gap formed between the opening and closing door (7) and the edge portion of the opening portion (1a) when the opening portion (1a) is closed by the opening and closing door (7) is provided; wherein the lip seal (7c) is joined to a tip of the opening and closing door (7), the lip seal (7c) is configured to seal the opening portion (1a) so that an end of the lip seal (7c) comes into contact with the edge portion (1b) of the opening portion (1a) so as to block an air flow when the opening and closing door (7) closes the opening portion (1a) through which air flows, and the lip seal (7c) comprises sides (7e), a base portion (7K) of the sides, protruding portions (7f), and a number of extending portions (7g); wherein the protruding portion (7f) is provided on a tip of the side (7e) so as to protrude toward the edge portion (1b) of the opening portion (1a) in a state in which the protruding portion (7f) linearly extends along the tip ends of the opening and closing door (7) and the protruding portion (7f) comes into contact with the edge portion (1b) of the opening portion (1a) when the opening and closing door (7) is closed; and wherein a number of the extending portions (7g) are integrally formed with the respective sides (7e) in a row along the protruding portions (7f).

In a tenth aspect of the present invention, an air passage opening and closing device is characterized in that the tips of the extending portions (7g) form a tip of the lip seal (7c), the extending direction of the extending portions (7g) is set to further from the edge portion (1b) of the opening portion (1a) than an extending direction of the side (7e), and the extending direction of the outside of the extending portion (7g) and the extending direction of the outside of the side (7e) intersect with each other by a predetermined angle (θ).

In an eleventh aspect of the present invention, an air passage opening and closing device is characterized in that the sides (7e) are formed as a pair, a pair of the sides (7e) are joined at the base portion (7k), as a pair of the sides (7e) are formed so that the inside distance between a pair of the sides (7e) increases in a direction from the tip of the opening and closing door (7) to the tip of the lip seal (7c), the lip seal (7c) is totally formed in a V shape, and the protruding portion (7f) is provided on each tip of a pair of the sides (7e) so as to protrude toward the outside of the side opposite to the inside thereof.

In a twelfth aspect of the present invention, an air passage opening and closing device is characterized in that tips of the extending portions (7g) form a tip of the lip seal (7c), the extending direction of the extending portion (7g) is set more inside than the extending direction of the each side (7e), and the extending direction of the outside of the extending portion (7g) and the extending direction of the outside of the each side (7e) intersect with each other by a predetermined angle (θ).

The symbols in the parentheses attached to each means described above indicate correspondence with specific means in embodiments which will be described later.

The present invention may be more fully understood from the description of the preferred embodiments of the invention set forth below, together with the accompanying drawings.

BRIEF DESCRIPTION OF THE DRAWINGS

In the drawings:

FIG. 10 is a graph for showing whether abnormal noise occurs or not.

DESCRIPTION OF THE PREFERRED EMBODIMENTS

First Embodiment

Figure 1:
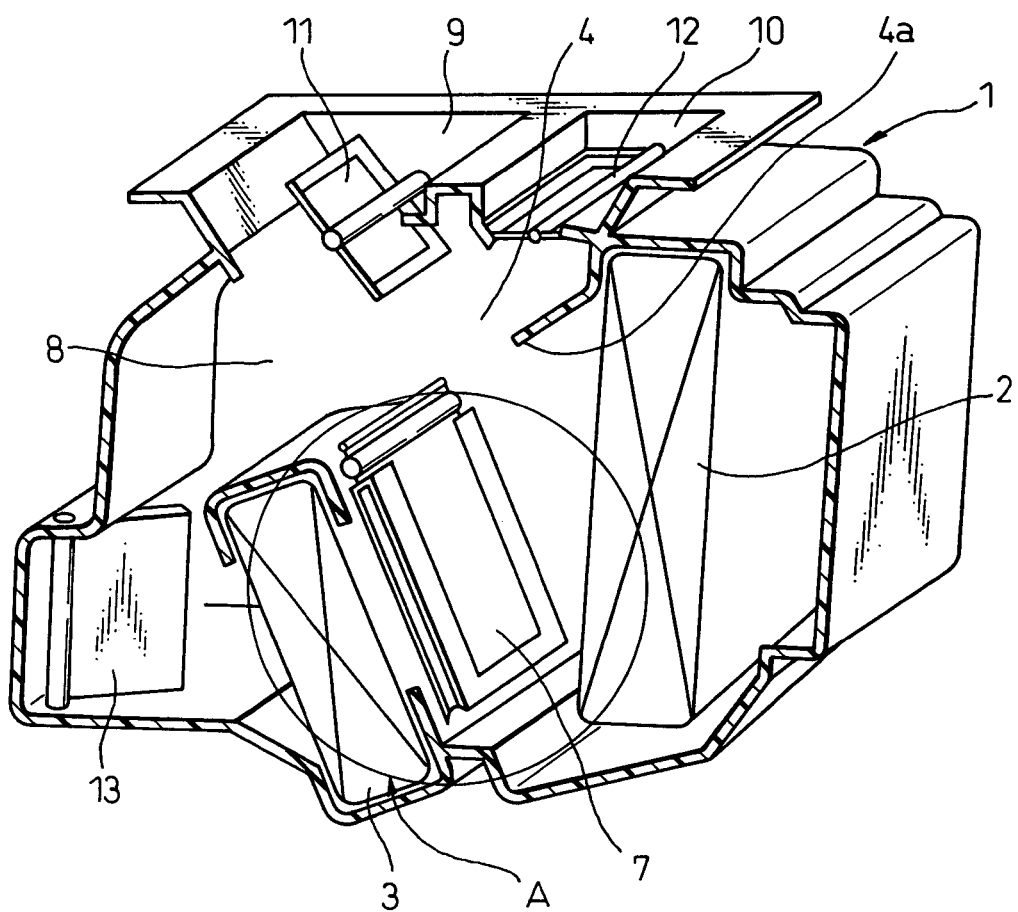
FIG. 1 is a perspective view showing a structure of an indoor unit of an air conditioner for a vehicle.
Figure 2:
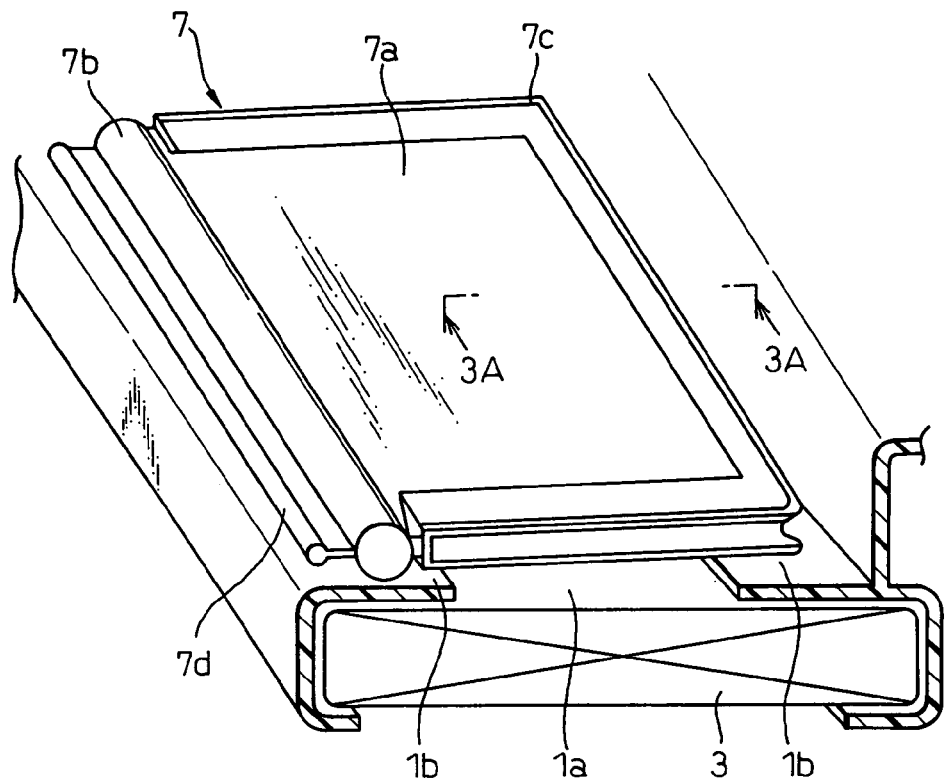
FIG. 2 is an enlarged perspective view of the A portion in FIG. 1.

In a first embodiment, an air passage opening and closing device according to the present invention is applied to an indoor unit of an air conditioner for a vehicle.

The components of the indoor unit according to the present embodiment, other than an air-mixing door 7, a face door 11, a defroster door 12 and a foot door 13, are the same as the components included in the exemplary indoor unit of the prior art which has been described in "Description of the Related Art" in this specification. The difference of the indoor unit according to the present embodiment with respect to that of the example of the prior art is in the shapes of lip seals of the air-mixing door 7, the face door 11, the defroster door 12 and the foot door 13.

The air-mixing door 7 mixes air in a casing 1 of an air conditioner for a vehicle, the face door 11 directs an air flow towards a face of a passenger from the casing, the defroster door 12 directs an air flow towards a windshield from the casing, the foot door 13 directs an air flow towards the feet of a passenger from the casing. All of these doors have a rectangular shape and the length of the short sides thereof is in a range between 3 cm and 10 cm and the length of the long sides thereof is in a range between 5 cm and 30 cm.

The air-mixing door 7, the face door 11, the defroster door 12 and the foot door 13 open and close their opening portions by swinging (rotating) the rectangular plate-like door bodies thereof, around the rotation axes thereof as a center, by actuators such as a servo motor, etc., as described above, and the basic constructions in the air-mixing door 7, the face door 11, the defroster door 12 and the foot door 13 are common and, therefore, the difference of the air-mixing door 7 with respect to that of the example of the prior art is mainly described below, as an example, in order to explain the present embodiment.

Figure 5:
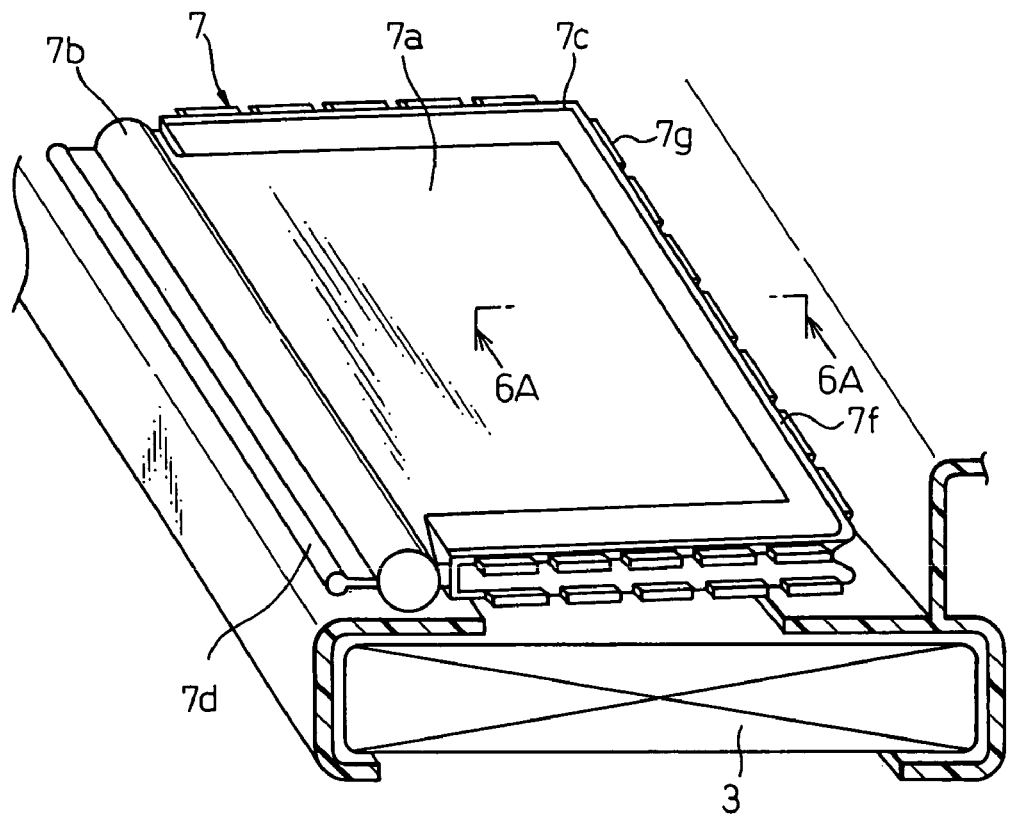
FIG. 5 is a perspective view showing an area around an air-mixing door 7 and an opening portion in an embodiment according to the present invention.
Figure 6:
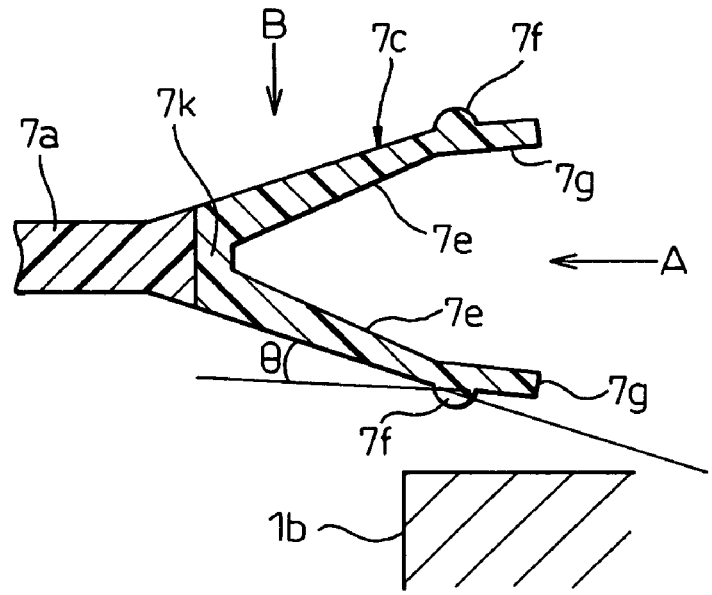
FIG. 6 is a sectional view taken along the line 6A—6A in FIG. 5.
Figure 7:
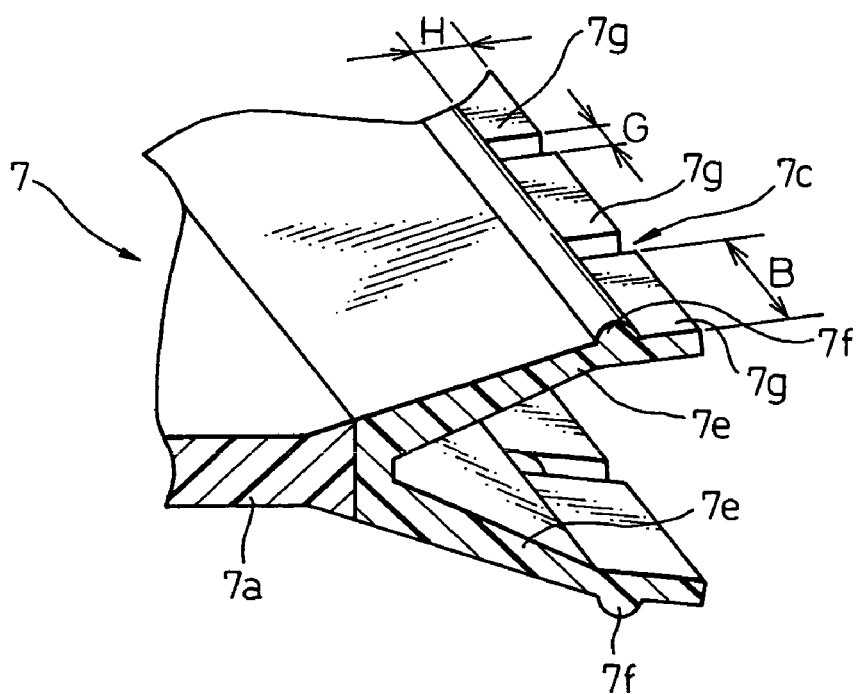
FIG. 7 is an enlarged perspective view of a lip seal in an embodiment according to the present invention.
Figure 8:
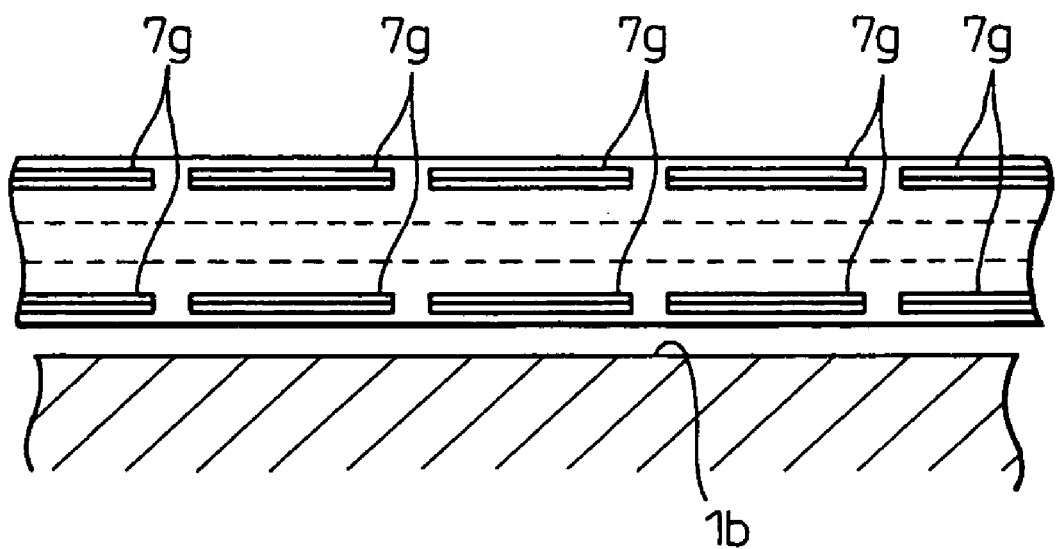
FIG. 8 is a drawing viewed in the A arrow direction in FIG. 6.
Figure 9:
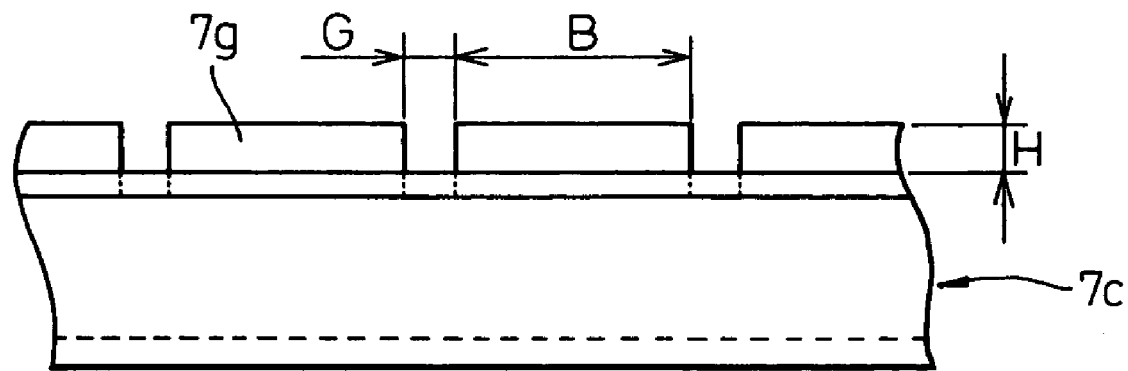
FIG. 9 is a drawing viewed in the B arrow direction in FIG. 6.

FIG. 5 is a perspective view showing an area near the air-mixing door 7 and an opening portion 1*a* in the present embodiment, FIG. 6 is a sectional view taken along the line 6A—6A in FIG. 5, FIG. 7 is an enlarged perspective view of a lip seal 7*c*, FIG. 8 is a drawing viewed from A arrow direction in FIG. 6 and FIG. 9 is a drawing viewed from B arrow direction in FIG. 6.

Figure 3:
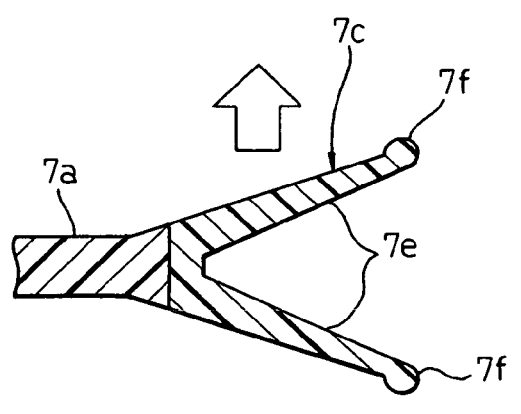
FIG. 3 is a sectional view taken along the line 3A—3A in FIG. 2.
Figure 3:
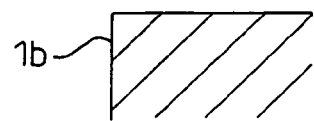
Figure 4:
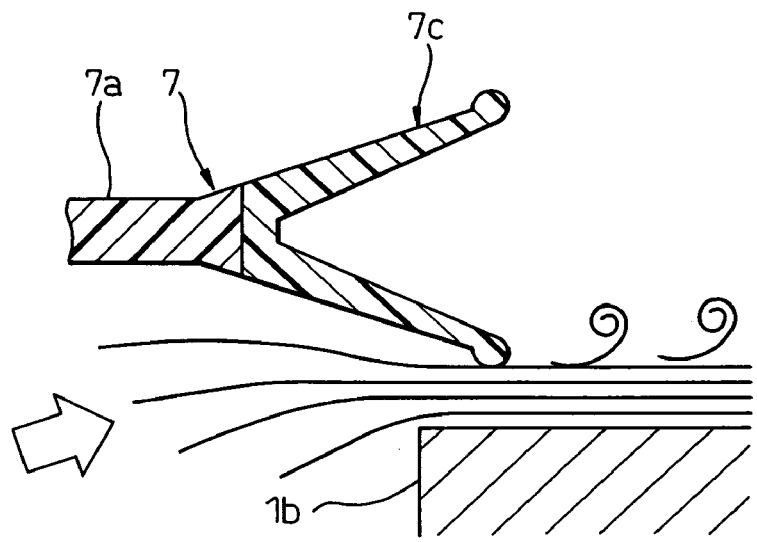
FIG. 4 is a drawing for explaining the cause of abnormal noise.

In the present embodiment, a plurality of extending portions 7*g* which extend in the direction parallel to a door body 7*a* are integrally formed with the lip seal 7*c*, as shown in FIG. 7, at the tip side of the lip seal 7*c*, that is, the tip side of a side 7*e*, in comparison with the lip seal 7*c* of the air-mixing door 7 according to the example of the prior art shown in FIG. 3 and the like.

To be specific, the lip seal 7*c* is coupled to the tip of the door body 7*a*, the lip seal 7*c* acts as a seal for blocking an air flow by a way in which the lip seal 7*c* comes into contact with the edge portion 1*b* of the opening portion 1*a* when the door body closes the opening portion through which air flows.

The lip seal 7*c* comprises a pair of sides 7*e*, a base portion 7*k* formed by joining the sides, a pair of protruding portions 7*f* and a number of extending portions 7*g*.

The distance of the space between two sides 7*e* of the lip seal 7*c*, that is an inside, is increased as it proceeds in a direction from the tip of the door body 7*a* to the tip of the lip seals 7*c*. In other words, the lip seal 7*c* is totally formed in a V shape with a pair of sides 7*e* of the lip seal 7*c*.

The protruding portions 7*f* which protrude to the outside opposite to the inside, described above, are provided on the tip of a pair of sides 7*e* respectively, the protruding portions 7*f* are formed in a linear line which extends along the tip of the door body 7*a* and, therefore, improves the sealing effect thereof as the protruding portion 7*f* comes into contact with the edge portion 1*b* of the opening portion 1*a*.

In addition, a number of the extending portions 7*g* for preventing a whistle-like noise are formed in a row together with each side 7*e* along the protruding portions 7*f*, wherein the extending direction of the extending portions 7*g* is approximate to the extending direction of each side 7*e*.

The tips of the extending portions 7*g* forms the tip of the lip seal 7*c* and the extending direction of the extending portions 7*g* is located more inside than the extending direction of the respective sides 7*e* so that the outside extending direction of the extending portions 7*g* intersects with the outside extending direction of the respective sides 7*e* by a predetermined angle (θ). Due to the intersection, the protruding portion 7*f* easily comes into contact with the edge portion 1*b* of the opening portion 1*a* and, therefore, the protruding portion 7*f* securely provides a sealing portion. Because of this configuration, even if a seal is in an incomplete state the extending portions 7*g* prevent abnormal noise like noise caused by a blowing wind, etc.

In this case, the extending dimension H (refer to FIG. 9) of the extending portions 7*g* is more than or equal to about 1 mm and less than or equal to about 3 mm, the dimension B (refer to FIG. 9) in the width direction orthogonal to the extending direction in the extending portions 7*g* is more than or equal to about 2 mm and less than or equal to about 14 mm, and the distance G (refer to FIG. 9) between the adjacent extending portions 7*g* is more than or equal to about 1 mm and less than or equal to about 4 mm.

In the present embodiment, the extending dimension H of the extending portions 7*g* is set to about 2 mm, the dimension B in the width direction orthogonal to the extending direction in the extending portions 7*g* is set to 9 mm, and the distance G between the adjacent extending portions 7*g* is set to 3 mm.

Moreover, in the present embodiment, the angle between two sides 7*e* is about 60 degree, the door body 7*a* and the shaft portion 7*b* are made of a hard resin such as polypropylene etc., the lip seals 7*c*, 7*d* are made of a flexible resin such as elastomer etc. and they are integrally molded in order to be integrated.

The protruding portion 7*f* is formed in a semicircular sectional shape with a radius more than or equal to about 0.5 mm and less than or equal to about 0.6 mm.

The functions and effects of the present embodiment will be described below.

In the present embodiment, as a plurality of the extending portions 7*g* are provided on the tip side of the lip seal 7*c*, the air flow passing through a gap between the lip seal 7*c* and the edge portion 1*b* of the opening portion 1*a* can be disturbed and mixed.

Accordingly, it is possible to prevent the air flow from becoming a laminar flow so as to restrict the occurrence of a row of vortexes. As a result, it is possible to prevent the occurrence of uncomfortable abnormal noise such as "hyu".

In addition, as the extending dimension H of the extending portions 7*g* is more than or equal to about 1 mm and less than or equal to about 3 mm, the dimension B in the width direction orthogonal to the extending direction in the extending portions 7*g* is more than or equal to about 2 mm and less than or equal to about 14 mm and the distance G between the adjacent extending portions 7*g* is more than or equal to about 1 mm and less than or equal to about 4 mm, it is obvious from the graph of the test results shown in FIG. 10 that it is possible to prevent surely the occurrence of a row of vortexes in order to reduce abnormal noise.

The graph of the test results shown in FIG. 10 indicates test results in a condition in which the air flow rate is set between 10 to 40 m3/h and the gap between the lip seal 7*c* and the edge portion 1*b* is set between 0 to 10 mm and the reduction of the noise is confirmed by the auditory sense.

Second Embodiment

In a second embodiment, the extending dimension H of the extending portions 7*g* is more than or equal to about 1.5 mm and less than or equal to about 3 mm, the dimension B in the width direction orthogonal to the extending direction in the extending portions 7g is more than or equal to about 5 mm and less than or equal to about 10 mm and the distance G between the adjacent extending portions 7g is more than or equal to about 2 mm and less than or equal to about 4 mm.

In this configuration, as the air flow passing through a gap between the lip seal 7c and the edge portion 1b of the opening portion 1a can be disturbed and mixed, it is possible to prevent the air flow from becoming a laminar flow so as to restrict the occurrence of a row of vortexes. As a result, it is possible to prevent the occurrence of uncomfortable abnormal noise such as "hyu".

Other Embodiment

The embodiments described above are the same as the example of prior art explained in "Description of the Related Art" other than the shape of the lip seal 7c, but the present invention is not limited to these embodiments.

In the embodiments described above, the shape of the extending portions 7g is made to be rectangular, but the present invention is not limited to these embodiments and it may be, for example, triangular or semicircular.

The present invention meets the basic concept of the invention disclosed in the claims, but the present invention is not limited to the embodiments described above.

For example, the lip seal need not be made in a V shape and it may be one having one side extending from the tip of the door.

The lip seal need not be provided with extending portions on each side, respectively, even if the shape thereof is a V shape and the means for preventing abnormal noise like noise caused by whistling, etc. may be provided on only the required side of them.

In addition, the shapes of extending portions arranged together need not be the same and the lip seal may be configured by combining extending portions with various shapes with dimensions within a specific range.

While the invention has been described by reference to specific embodiments chosen for the purposes of illustration, it should be apparent that numerous modifications could be made, thereto by those skilled in the art, without departing from the basic concept and scope of the invention.

The invention claimed is:

1. An air passage opening and closing device for controlling an air flow for air-conditioning a vehicle compartment comprising:
   a casing of an air conditioner for a vehicle which has an opening portion through which air flows, forms air passages and is provided with at least an evaporator; and
   an opening and closing door which opens and closes the opening portion and mixes air from the evaporator with hot air or switches an air discharging mode at least between a face mode and a foot mode;
   wherein on a portion of an end side of the opening and closing door, corresponding to an edge portion of the opening portion, an elastically deformable lip seal for closing a gap formed between the opening and closing door and the edge portion of the opening portion when the opening portion is closed by the opening and closing door is provided, and on a tip of the lip seal a plurality of extending portions are provided; and
   wherein an extending dimension of the extending portions is more than or equal to substantially 1 mm and less than or equal to substantially 3 mm, a dimension in a width direction orthogonal to the extending direction in the extending portions is more than or equal to 2 mm and less than or equal to 14 mm, and a gap distance between adjacent extending portions is more than or equal to 1 mm and less than or equal to 4 mm.

2. An air passage opening and closing device as set forth in claim 1, wherein the extending dimension of the extending portions provided on the tip of the lip seal is more than or equal to 1.5 mm and less than or equal to 3 mm, the dimension in the width direction orthogonal to the extending direction in the extending portion is more than or equal to 5 mm and less than or equal to 10 mm, and the gap distance between the adjacent extending portions is more than or equal to 2 mm and less than or equal to 4 mm.

3. An air passage opening and closing device as set forth in claim 1, wherein, on a root side of the extending portion, protruding portions in a linear shape which protrude toward the edge portion of the opening portion and come into contact with the edge portions when the opening and closing door is closed are integrally formed.

4. An air passage opening and closing device as set forth in claim 1, wherein a sectional shape of the lip seal is a V shape in which a portion thereof near the opening and closing door protrudes.

5. An air passage opening and closing device as set forth in claim 4, wherein the V shape of the lip seal which extends toward the opening and closing door has two sides which separate further in a direction from the tip of the opening and closing door toward tips of the sides.

6. An air passage opening and closing device as set forth in claim 1, wherein the lip seal and the extending portions provided on the tip of the lip seal are integrally formed.

7. An air passage opening and closing device as set forth in claim 1, wherein the lip seal and the opening and closing door are integrally formed.

8. An air passage opening and closing device as set forth in claim 1, wherein the opening and closing door comprises any one of:
   an air-mixing door for mixing air in the casing of the air conditioner for a vehicle;
   a face door for directing air flow from the casing of the air conditioner for a vehicle toward a passenger's face;
   a defroster door for directing air flow from the casing of the air conditioner for a vehicle toward a windshield direction; and
   a foot door for directing air flow from the casing of the air conditioner for a vehicle toward a passenger's feet; and
   wherein all of these doors are rectangular, a length of shorter sides thereof is in a range between 3 cm and 10 cm, and a length of longer sides thereof is in a range between 5 cm and 30 cm.

9. An air passage opening and closing device for controlling an air flow for air-conditioning a vehicle compartment comprising:
   a casing of an air conditioner for a vehicle which has an opening portion through which air flows and forms air passages; and
   an opening and closing door which opens and closes the opening portion;
   wherein on a portion of an end side of the opening and closing door, corresponding to an edge portion of the opening portion, an elastically deformable lip seal for closing a gap formed between the opening and closing door and the edge portion of the opening portion when the opening portion is closed by the opening and closing door, is provided;
   wherein the lip seal is joined to a tip of the opening and closing door, the lip seal is configured to seal the opening portion so that an end of the lip seal comes into contact with the edge portion of the opening portion so as to block air flow when the opening and closing door closes the opening portion through which air flows, and the lip seal comprises;

a base portion joined to the tip of the opening and closing door, a pair of sides extending outward from the base portion, a protruding portion extending outwardly from a surface on each side of the pair of sides and a plurality of extending portions extending outward from each protruding portion, each of the protruding portions extending along the entire tip of the opening and closing door and one of the protruding portions comes into contact with the edge portion of the opening portion when the opening and closing door is closed; and wherein the extending portions are integrally formed with a respective side in a row extending outward from the protruding portions.

10. An air passage opening and closing device as set forth in claim 9, wherein tips of the extending portions form a tip of the lip seal, an extending direction of the extending portions is set further from the edge portion of the opening portion than an extending direction of the side, and an extending direction of an outside of the extending portion and an extending direction of an outside of the side intersect with each other by a predetermined angle.

11. An air passage opening and closing device as set forth in claim 9, wherein;

the pair of the sides are joined at the base portion;

the pair of the sides are formed so that an inside distance between the pair of the sides increases in a direction from the tip of the opening and closing door to the tip of the lip seal, the lip seal is totally formed in a V shape; and the protruding portion is provided on each tip of the pair of the sides so as to protrude toward the outside of the side opposite to the inside thereof.

12. An air passage opening and closing device as set forth in claim 11, wherein tips of the extending portions form a tip of the lip seal, an extending direction of the extending portion is set more inside than an extending direction of the each side, and an extending direction of an outside of the extending portion and an extending direction of an outside of the each side intersect at a predetermined angle.

* * * * *